(12) United States Patent
Takai et al.

(10) Patent No.: US 12,378,365 B2
(45) Date of Patent: Aug. 5, 2025

(54) ORGANOPOLYSILOXANE MODIFIED WITH LACTATE SILYL AT BOTH ENDS AND METHOD FOR PRODUCING SAME

(71) Applicant: Shin-Etsu Chemical Co., Ltd., Tokyo (JP)

(72) Inventors: Misaki Takai, Annaka (JP); Akitsugu Fujiwara, Annaka (JP); Takafumi Sakamoto, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 972 days.

(21) Appl. No.: 17/600,626

(22) PCT Filed: Mar. 26, 2020

(86) PCT No.: PCT/JP2020/013535
§ 371 (c)(1),
(2) Date: Oct. 1, 2021

(87) PCT Pub. No.: WO2020/203607
PCT Pub. Date: Oct. 8, 2020

(65) Prior Publication Data
US 2022/0098371 A1 Mar. 31, 2022

(30) Foreign Application Priority Data
Apr. 3, 2019 (JP) ................. 2019-071485

(51) Int. Cl.
*C08G 77/50* (2006.01)
*C08G 77/18* (2006.01)
*C08G 77/38* (2006.01)

(52) U.S. Cl.
CPC ............. *C08G 77/50* (2013.01); *C08G 77/18* (2013.01); *C08G 77/38* (2013.01)

(58) Field of Classification Search
CPC ........ C08G 77/50; C08G 77/18; C08G 77/38; C08G 77/12; C08G 77/16; C08G 77/14; C08K 5/5419; C08K 5/5425; C08L 83/04
See application file for complete search history.

(56) References Cited

U.S. PATENT DOCUMENTS

| 4,511,728 A | 4/1985 | Kreuzer et al. |
| 2012/0016072 A1 | 1/2012 | Ederer et al. |
| 2016/0017195 A1 * | 1/2016 | Pichl ........ C08L 83/00 525/477 |
| 2018/0016400 A1 | 1/2018 | Gutacker et al. |
| 2020/0317919 A1 | 10/2020 | Fujiwara et al. |

FOREIGN PATENT DOCUMENTS

| CN | 105238342 A | 1/2016 | |
| CN | 107523257 A | 12/2017 | |
| JP | 58-185594 A | 10/1983 | |
| JP | 2010-537015 A | 12/2010 | |
| JP | 5399392 B2 | 1/2014 | |
| JP | 2016516101 A * | 6/2016 | |
| JP | 2018515634 A * | 6/2018 | |
| WO | WO-2018091582 A1 * | 5/2018 | ........ C08G 77/08 |
| WO | WO-2019069706 A1 * | 4/2019 | ........ C08G 77/38 |

OTHER PUBLICATIONS

International Search Report, issued in PCT/JP2020/013535, dated Jun. 16, 2020.
Written Opinion of the International Searching Authority, issued in PCT/JP2020/013535, dated Jun. 16, 2020.

* cited by examiner

*Primary Examiner* — Kumar R Bhushan
(74) *Attorney, Agent, or Firm* — Birch, Stewart, Kolasch & Birch, LLP

(57) ABSTRACT

An organopolysiloxane modified with a lactate silyl at both ends according to the present invention, which is represented by general formula (1)

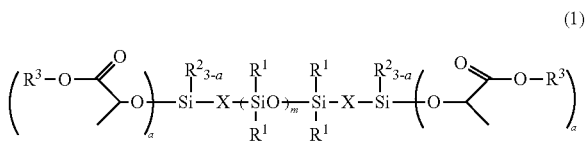

(1)

(wherein each of $R^1$, $R^2$ and $R^3$ independently represents an unsubstituted or substituted monovalent hydrocarbon group having 1-10 carbon atoms; m represents an integer of 10 or more; each a independently represents 2 or 3; and X represents an alkylene group having 2-4 carbon atoms or an oxygen atom), is useful as a starting material siloxane for a surface treatment agent for inorganic materials, a coating agent for water repellent treatments, and especially for a room-temperature curable (RTV) silicone rubber composition.

2 Claims, 2 Drawing Sheets

ORGANOPOLYSILOXANE MODIFIED WITH LACTATE SILYL AT BOTH ENDS AND METHOD FOR PRODUCING SAME

TECHNICAL FIELD

The present invention relates to an organopolysiloxane modified with lactate silyl at both ends capable of being hydrolyzed by moisture in the air at room temperature (25° C.±15° C.) to release a lactate ester, and a method for producing the same.

BACKGROUND ART

As a raw material siloxane of a room-temperature-vulcanizing (RTV) silicone rubber composition, organopolysiloxane in which both molecular chain ends are modified with silanol groups or alkoxy groups is conventionally used.

As a condensation curing type of a room-temperature-vulcanizing (RTV) silicone rubber composition, a dealcoholization type, a deoxime type, a deacetic acid type, and the like are generally known, and are used in various applications. For example, the dealcoholization type is widely used in electrical and electronic component fixing adhesive agents or coating agents, automotive adhesives, and the like. Since the deoxime type and the deacetic acid type are relatively fast in curability, they are mainly used in sealing agents for building material in many cases. However, since a gas produced as a by-product during curing has a toxic or irritating odor, they have a safety problem. In addition, since the deoxime type and the deacetic acid type have a concern about corrosiveness to an adherend, attention needs to be paid at the time of use.

As a recent new curing technology, a room-temperature-vulcanizing (RTV) silicone rubber composition of a delactic acid ester type by a condensation reaction has been disclosed (Patent Document 1: JP No. 5399392). Patent Document 1 shows that a room-temperature-vulcanizing (RTV) silicone rubber composition including polydimethylsiloxane having silanol groups at both molecular chain ends and ethyl lactate silane is superior to conventional deoxime-type and the like, in terms of human body health and environment. In addition, it is described that since it has a weaker odor and is not uncomfortable as compared with conventional curing type, workability is also good. However, in Patent Document 1, the room-temperature-vulcanizing (RTV) silicone rubber composition has a very slow curing rate (very long curing time).

In order to solve this problem, a silicone rubber composition with a molar ratio of aminosilane and a tin compound in the composition of 1:1 to 50:1 is disclosed (Patent Document 2: JP-T 2018-515634). However, in Patent Document 2, the production method is divided into three steps, and the number of steps is increased.

PRIOR ART DOCUMENTS

Patent Documents

Patent Document 1: JP No. 5399392
Patent Document 2: JP-T 2018-515634

SUMMARY OF INVENTION

Technical Problem

The present invention has been made to improve the above circumstances, and an object of the present invention is to provide an organopolysiloxane modified with lactate silyl at both ends particularly useful as a raw material siloxane of a room-temperature-vulcanizing (RTV) silicone rubber composition.

Solution to Problem

As a result of diligent efforts to achieve the above object, the present inventors have found that an organopolysiloxane modified with lactate silyl at both ends represented by the following general formula (1):

[Chem. 1]

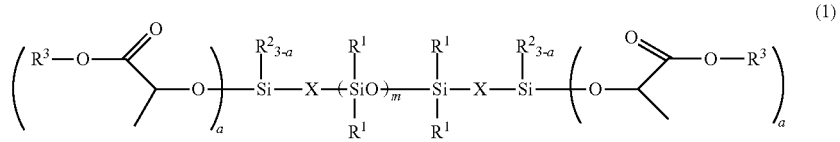

(1)

wherein $R^1$, $R^2$, and $R^3$ are each independently an unsubstituted or substituted monovalent hydrocarbon group having 1 to 10 carbon atoms, m is an integer of 10 or more, a is independently 2 or 3, and X is an alkylene group having 2 to 4 carbon atoms or an oxygen atom, is preferable as a surface treatment agent for inorganic materials, a coating agent for water repellent treatment, particularly as a raw material siloxane of a room-temperature-vulcanizing (RTV) silicone rubber composition, and have completed the present invention.

That is, the present invention provides the following organopolysiloxane modified with lactate silyl at both ends and a method for producing the same.

[1]
An organopolysiloxane modified with lactate silyl at both ends having the following general formula (1):

[Chem. 2]

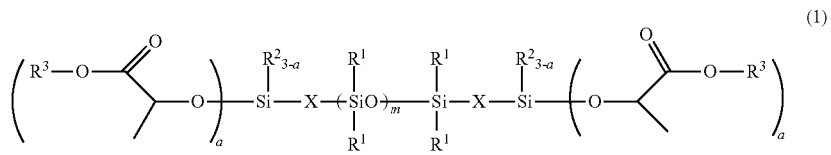

wherein $R^1$, $R^2$, and $R^3$ are each independently an unsubstituted or substituted monovalent hydrocarbon group having 1 to 10 carbon atoms, m is an integer of 10 or more, a is independently 2 or 3, and X is an alkylene group having 2 to 4 carbon atoms or an oxygen atom.

[2]
An organopolysiloxane modified with lactate silyl at both ends having the following general formula (2):

[Chem. 3]

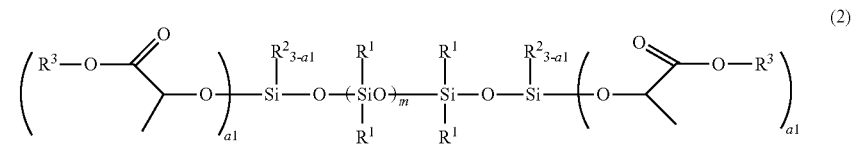

wherein $R^1$, $R^2$, and $R^3$ are each independently an unsubstituted or substituted monovalent hydrocarbon group having 1 to 10 carbon atoms, m is an integer of 10 or more, and a1 is independently 2 or 3.

[3]
An organopolysiloxane modified with lactate silyl at both ends having the following general formula (3):

[Chem. 4]

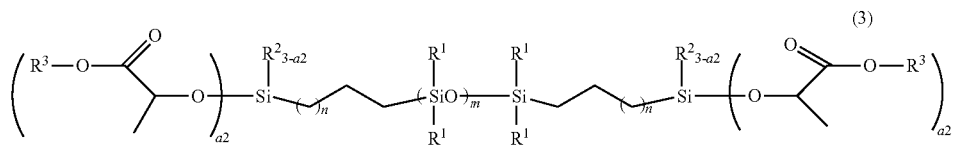

wherein $R^1$, $R^2$, and $R^3$ are each independently an unsubstituted or substituted monovalent hydrocarbon group having 1 to 10 carbon atoms, m is an integer of 10 or more, n is independently 0, 1, or 2, and a2 is independently 2 or 3.

[4]
A method for producing an organopolysiloxane modified with lactate silyl at both ends having the following general formula (2) according to [2],

[Chem. 7]

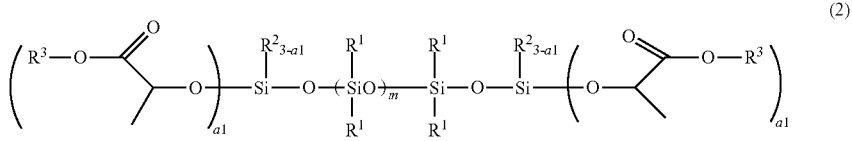

(2)

wherein $R^1$ is independently an unsubstituted or substituted monovalent hydrocarbon group having 1 to 10 carbon atoms, $R^2$ and $R^3$ are each independently an unsubstituted or substituted monovalent hydrocarbon group having 1 to 10 carbon atoms, m is an integer of 10 or more, and a1 is independently 2 or 3, comprising carrying out a condensation reaction of:
(A) an organopolysiloxane having silanol groups at both ends having the following general formula (4):

[Chem. 5]

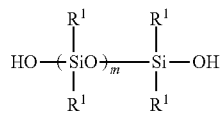

(4)

wherein $R^1$ and m are the same as described above, and
(B) an organosilane compound having the following general formula (5):

[Chem. 6]

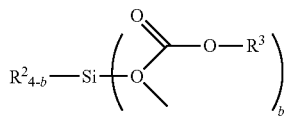

(5)

wherein $R^2$ and $R^3$ are the same as described above, and b is 3 or 4,
in the presence of:
(C) a primary amine having a boiling point of 30 to 100° C.

[5]
A method for producing an organopolysiloxane modified with lactate silyl at both ends having the following general formula (3) according to [3], substituted monovalent hydrocarbon group having 1 to 10 carbon atoms, m is an integer of 10 or more, n is 0, 1, or 2, and a2 is 2 or 3, comprising carrying out an addition reaction of:
(D) an organopolysiloxane having SiH groups at both ends having the following general formula (6):

[Chem. 8]

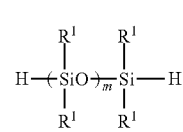

(6)

wherein $R^1$ and m are the same as described above, and
(E) an organosilane compound having the following general formula (7):

[Chem. 9]

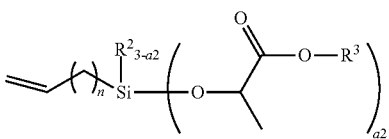

(7)

wherein $R^2$, $R^3$, n, and a2 are the same as described above,
in the presence of:
(F) a platinum group metal catalyst.

Advantageous Effects of Invention

The organopolysiloxane modified with lactate silyl at both ends of the present invention is effective as a surface treatment agent for inorganic materials, a coating agent for water repellent treatment, and particularly as a raw material siloxane of a room-temperature-vulcanizing (RTV) silicone rubber composition, and it is expected that the step for producing a room-temperature-vulcanizing (RTV) silicone rubber composition is simplified by using the present compound.

[Chem. 10]

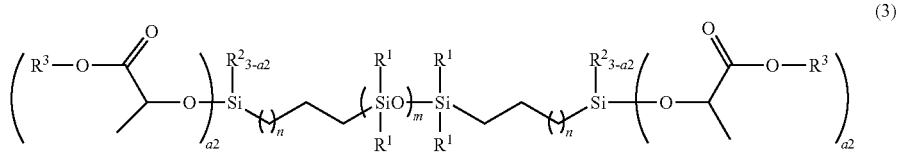

(3)

wherein $R^1$ is independently an unsubstituted or substituted monovalent hydrocarbon group having 1 to 10 carbon atoms, $R^2$ and $R^3$ are each independently an unsubstituted or

DESCRIPTION OF EMBODIMENTS

Figure 1:
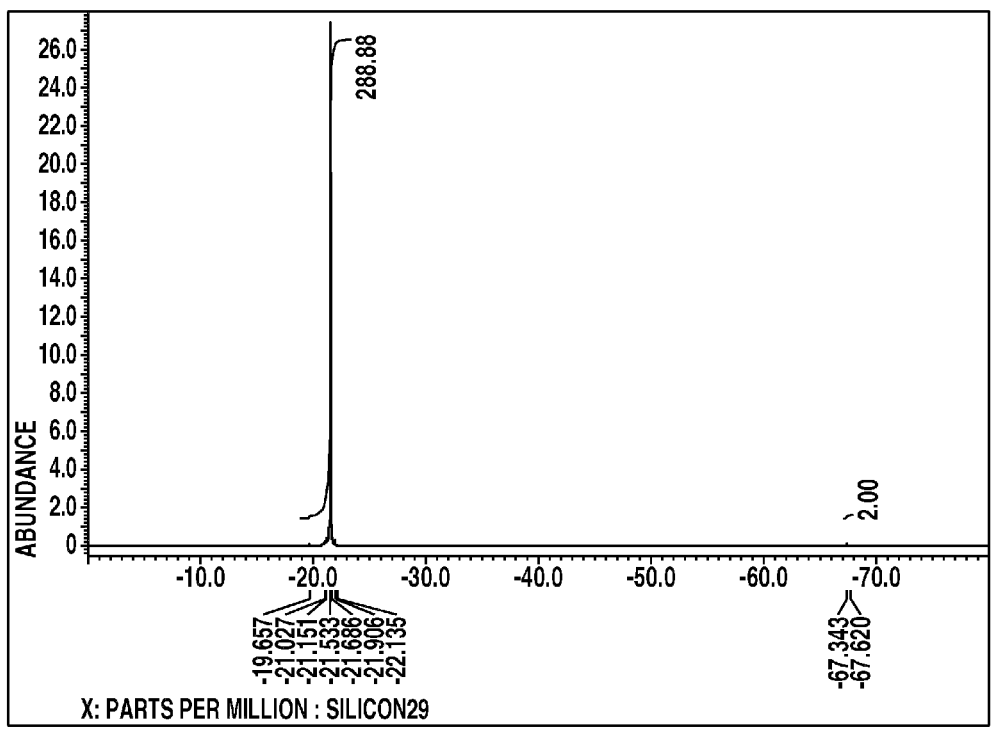
FIG. 1 is a $^{29}$Si-NMR spectrum diagram of an organopolysiloxane modified with lactate silyl at both ends obtained in Example 1 of the present invention.

Hereinafter, the present invention is described in detail.

The organopolysiloxane modified with lactate silyl at both ends of the present invention is a linear diorganopolysiloxane capped at both molecular chain ends with a hydrolyzable group-containing silyl group (lactate silyl group) capable of desorbing a lactic acid ester, represented by the following general formula (1):

[Chem. 11]

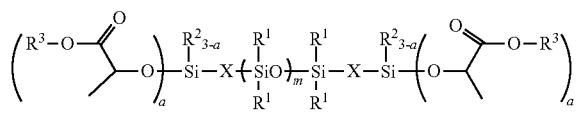

(1)

wherein $R^1$, $R^2$, and $R^3$ are each independently an unsubstituted or substituted monovalent hydrocarbon group having 1 to 10 carbon atoms, m is an integer of 10 or more, a is independently 2 or 3, and X is an alkylene group having 2 to 4 carbon atoms or an oxygen atom.

In the formula (1), $R^1$ is independently an unsubstituted or substituted monovalent hydrocarbon group having 1 to 10 carbon atoms, preferably 1 to 8 carbon atoms, and more preferably 1 to 6 carbon atoms, and is, for example, an alkyl group such as a methyl group, an ethyl group, a propyl group, an isopropyl group, a butyl group, an isobutyl group, a sec-butyl group, a tert-butyl group, a pentyl group, a hexyl group, a heptyl group, an octyl group, a 2-ethylhexyl group, a nonyl group, or a decyl group; a cyclic alkyl group such as a cyclopentyl group, or a cyclohexyl group; an alkenyl group such as a vinyl group, an allyl group, or a propenyl group; an aryl group such as a phenyl group, or a tolyl group; a group in which hydrogen atoms of these groups are partially substituted with halogen atoms, for example, a 3,3,3-trifluoropropyl group, or the like. Among them, a methyl group, a phenyl group, a 3,3,3-trifluoropropyl group, and the like are particularly preferable. A plurality of R's in the general formula (1) may be the same group or different groups.

Also, in the formula (1), m is an integer of 10 or more, usually 10 to 2,500, preferably 20 to 2,000, more preferably 50 to 1,200, and further preferably about 100 to 800, and preferably an integer such that the viscosity of the diorganopolysiloxane at 25° C. is in the range of 25 to 30,000 mPa·s, preferably in the range of 50 to 100,000 mPa·s, and more preferably in the range of 500 to 80,000 mPa·s.

In the present invention, m value (the degree of polymerization) indicating the number of repetitions of the diorganosiloxane unit or molecular weight can be usually determined as the polystyrene-equivalent number average degree of polymerization (or numerical average molecular weight) in gel permeation chromatography (GPC) analysis using toluene or the like as a developing solvent or the like (the same applies hereinafter). Also, the viscosity can be measured by a rotational viscometer (for example, a BL type, a BH type, a BS type, a cone and plate type, a rheometer, or the like) (the same applies hereinafter).

Further, in the formula (1), $R^2$ and $R^3$ are each independently an unsubstituted or substituted monovalent hydrocarbon group having 1 to 10 carbon atoms, preferably 1 to 8 carbon atoms, and more preferably 1 to 6 carbon atoms, and are, for example, an alkyl group such as a methyl group, an ethyl group, a propyl group, an isopropyl group, a butyl group, an isobutyl group, a sec-butyl group, a tert-butyl group, a pentyl group, a hexyl group, a heptyl group, an octyl group, a 2-ethylhexyl group, a nonyl group, or a decyl group; a cyclic alkyl group such as a cyclopentyl group, or a cyclohexyl group; an alkenyl group such as a vinyl group, or an allyl group; an aryl group such as a phenyl group, or a tolyl group; a group in which hydrogen atoms of these groups are partially substituted with halogen atoms, for example, a 3,3,3-trifluoropropyl group, or the like. Among them, $R^2$ is preferably a methyl group, an ethyl group, or a vinyl group, and $R^3$ is preferably a methyl group or an ethyl group. $R^2$ and $R^3$ may be the same or different, and $R^a$s may be the same or different from each other.

a is 2 or 3.

In addition, in the hydrolyzable group represented in parentheses to which a of the formula (1) is attached, a methine carbon to which a methyl group is bonded can be an asymmetric center, but may be any of (R) form, (S) form, and racemate.

Examples of the organopolysiloxane modified with lactate silyl at both ends represented by the general formula (1) include organopolysiloxanes modified with lactate silyl at both ends represented by the following general formulas (2) and (3):

[Chem. 12]

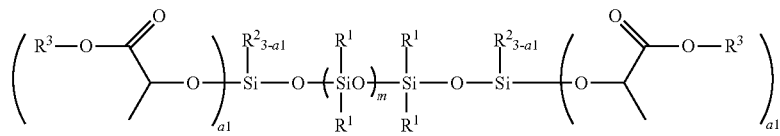

(2)

-continued

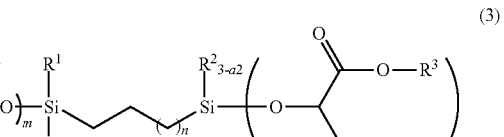

wherein $R^1$, $R^2$, $R^3$, and m are the same as described above, n is independently 0, 1, or 2 and preferably 0 or 1, a1 is independently 2 or 3 and preferably 2, and a2 is independently 2 or 3 and preferably 3.

One example of a method for producing the organopolysiloxane modified with lactate silyl at both ends represented by the general formula (1) is a method for producing an organopolysiloxane modified with lactate silyl at both ends represented by the formula (2) by a condensation reaction of an organopolysiloxane having one silanol group (hydroxyl group bonded to a silicon atom) at each of both molecular chain ends and an organosilane compound having three or four lactate groups in a molecule in the presence of a primary amine having a specific boiling point, and another example is a method for producing an organopolysiloxane modified with lactate silyl at both ends represented by the formula (3) by a hydrosilylation addition reaction of an organopolysiloxane having one SiH group (hydrogen atom bonded to a silicon atom) at each of both molecular chain ends and an organosilane compound having two or three lactate groups and at least one (one or two) alkenyl group bonded to a silicon atom in the presence of a platinum group metal catalyst.

Method for Producing Organopolysiloxane Modified with Lactate Silyl at Both Ends Represented by Formula (2)

Specifically, as a method for producing an organopolysiloxane modified with lactate silyl at both ends represented by the general formula (2), it can be produced by a condensation reaction of:
(A) an organopolysiloxane having silanol groups at both ends represented by the following general formula (4):

[Chem. 13]

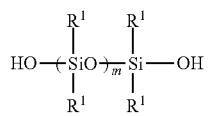

wherein $R^1$ and m are the same as described above, and
(B) an organosilane compound represented by the following general formula (5):

[Chem. 14]

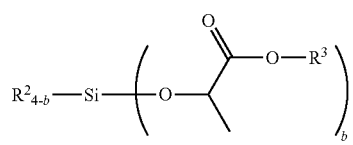

wherein $R^2$ and $R^3$ are the same as described above, and b is 3 or 4, in the presence of
(C) a primary amine having a boiling point of 30 to 100° C.

Hereinafter, the production method is described in detail.

[Component (A)]

Component (A) is an organopolysiloxane having one silanol group (hydroxyl group bonded to a silicon atom) at each of both ends (two in the molecule) represented by the following general formula (4):

[Chem. 15]

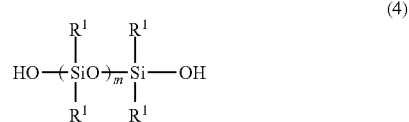

wherein $R^1$ and m are the same as described above.

In the formula (4), $R^1$ and m are the same as those in the general formulas (1) and (2), and examples of $R^1$ are the same as those exemplified for $R^1$ in the formula (1), and $R^1$ is preferably a methyl group, a phenyl group, or a 3,3,3-trifluoropropyl group. $R^1$ may be the same group or different groups.

Specific examples of the organopolysiloxane having silanol groups at both ends represented by the formula (4) include those shown below:

[Chem. 16]

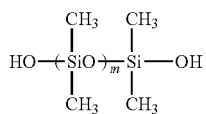

wherein m is the same as described above.

[Component (B)]

Component (B) is a hydrolyzable organosilane compound having three or four hydrolyzable groups (lactate groups) in a molecule (that is, tri-lactate (organo)silane or tetralactate silane) capable of desorbing a lactic acid ester represented by —O—CH(CH$_3$)—C(=O)O—R$^3$ (R$^3$ is the same as described above) in one molecule represented by the following general formula (5):

[Chem. 17]

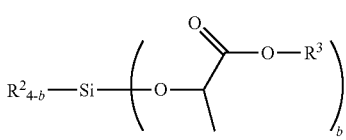

wherein R² and R³ are the same as described above, and b is 3 or 4.

In the formula (5), R² and R³ are the same as those of the general formulas (1) and (2), and examples of which are the same as those exemplified for R² and R³ in the formula (1). Among them, R² is preferably a methyl group, an ethyl group, or a vinyl group, and R³ is preferably a methyl group or an ethyl group. R² and R³ may be the same or different, and R³s may be the same or different from each other.

b is 3 or 4, and a1 in the general formula (2) is in a relationship of b=a1+1, and is particularly preferably 3. a1 is 2 or 3 and particularly preferably 2.

In addition, a methine carbon to which a methyl group of the formula (5) is bonded can be an asymmetric center, but may be any of (R) form, (S) form, and racemate.

Specific examples of the component (B) include methyltris(ethyl lactate)silane, vinyltris(ethyl lactate)silane, ethyltris(ethyl lactate)silane, n-propyltris(ethyl lactate)silane, n-butyltris(ethyl lactate)silane, methyltris(methyl lactate)silane, vinyltris(methyl lactate)silane, ethyltris(methyl lactate)silane, n-propyltris(methyl lactate)silane, n-butyltris(methyl lactate)silane, methyltris(n-propyl lactate)silane, vinyltris(n-propyl lactate)silane, ethyltris(n-propyl lactate)silane, n-propyltris(n-propyl lactate)silane, n-butyltris(n-propyl lactate)silane, and the like.

Among them, methyltris(ethyl lactate)silane, vinyltris(ethyl lactate)silane, methyltris(methyl lactate)silane, and vinyltris(methyl lactate)silane are preferable, and methyltris(ethyl lactate)silane and vinyltris(ethyl lactate)silane are particularly preferable.

The component (B) may be used singly or in combination of two or more kinds thereof.

With respect to the amount of the component (B) to be used, it is desirable to perform the reaction at a ratio such that the molar ratio of the hydroxyl groups bonded to the silicon atoms (silanol groups) in the component (A) and the component (B) (SiOH groups of (A):(B)) is about 1:1 to 1:50, preferably 1:1.8 to 1:30, and more preferably 1:2 to 1:10. Usually, a composition containing the component (A) and the component (B) contains a very small amount of moisture, and the lactate group of the component (B) may be consumed. Therefore, it is preferable to use an excessive amount of the component (B) relative to the hydroxyl group (silanol group) in the component (A). If the amount of the component (B) is too small, unreacted component (A) may remain, and if the amount is too large, a large amount of unreacted component (B) may remain after completion of the reaction, so that a large load may be applied to the next step.

[Component (C)]

Component (C) is a primary amine having a boiling point of 30 to 100° C. and preferably 30 to 80° C., and is a component used as a catalyst for a condensation reaction of the component (A) and the component (B). The component (C) may be used alone or as a mixture of two or more kinds.

The component (C) is easy to handle because it is liquid at room temperature. Since the boiling point is 100° C. or less, it can be completely removed by heating under reduced pressure or the like after completion of the reaction.

More specific examples thereof include propylamine (boiling point: 48° C.), isopropylamine (boiling point: 33° C.), butylamine (boiling point: 78° C.), isobutylamine (boiling point: 68 to 69° C.), sec-butylamine (boiling point: 63° C.), tert-butylamine (boiling point: 44.5° C.), allylamine (boiling point: 96 to 98° C.), and the like. Isopropylamine (boiling point: 33° C.) is particularly preferable.

The amount of the component (C) to be used is preferably 0.01 to 25 parts by weight and more preferably 0.05 to 10 parts by weight per 100 parts by weight of the component (A). If the amount of the component (C) is too small, the reaction may not proceed efficiently, and if the amount is too large, it is not economically preferable.

[Condensation Reaction]

In the organopolysiloxane modified with lactate silyl at both ends represented by the formula (2), the components (A), (B), and (C) are mixed at the above-described compounding ratio to carry out a condensation reaction. Reaction conditions can be usually set to a temperature range of 60 to 180° C. and preferably 80 to 110° C. for 60 to 600 minutes and preferably 180 to 420 minutes under atmospheric pressure.

Method for Producing Organopolysiloxane Modified with Lactate Silyl at Both Ends Represented by Formula (3)

Next, as a specific method for producing an organopolysiloxane modified with lactate silyl at both ends represented by the following general formula (3):

[Chem. 18]

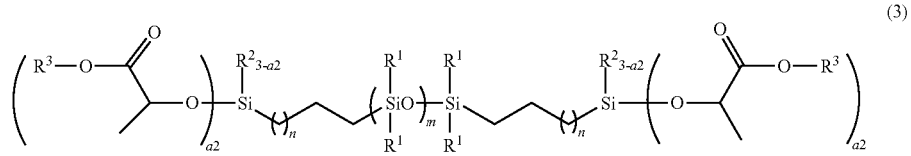

(3)

wherein R¹, R², R³, m, n, and a2 are the same as described above, it can be produced by a hydrosilylation addition reaction of:
(D) an organopolysiloxane having one SiH group (hydrogen atom bonded to a silicon atom) at each of both ends (two in the molecule) represented by the following general formula (6):

[Chem. 19]

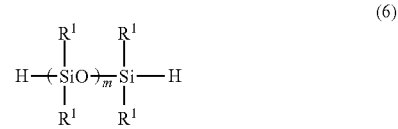

(6)

wherein R¹ and m are the same as described above, and
(E) an organosilane compound having two or three lactate groups and at least one (one or two) alkenyl group bonded to a silicon atom having 2 to 4 carbon atoms in a molecule represented by the following general formula (7):

[Chem. 20]

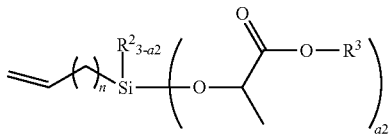

(7)

wherein R², R³, n, and a2 are the same as described above, in the presence of (F) a platinum group metal catalyst.

Hereinafter, the production method is described in detail.

[Component (D)]

Component (D) is an organopolysiloxane having one SiH group (hydrogen atom bonded to a silicon atom) at each of both ends (two in the molecule) represented by the following general formula (6):

[Chem. 21]

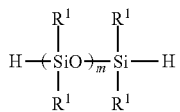

(6)

wherein $R^1$ and m are the same as described above.

In the formula (6), $R^1$ and m are the same as those in the general formulas (1) and (3), and examples of $R^1$ are the same as those exemplified for $R^1$ in the formula (1), and $R^1$ is preferably a methyl group, a phenyl group, or a 3,3,3-trifluoropropyl group. $R^1$ may be the same group or different groups.

Specific examples of the organopolysiloxane having SiH groups (hydrogen atoms bonded to silicon atoms) at both ends represented by the formula (6) include those shown below (dimethylpolysiloxane capped at both molecular chain ends with dimethylhydrogensiloxy groups):

[Chem. 22]

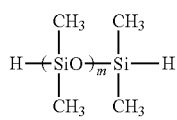

wherein m is the same as described above.

[Component (E)]

Component (E) is a hydrolyzable organosilane compound having at least one (one or two), preferably one alkenyl group bonded to a silicon atom having 2 to 4 carbon atoms such as a vinyl group in the molecule represented by the following general formula (7), and having two or three, preferably three hydrolyzable groups (lactate groups) capable of desorbing a lactic acid ester represented by —O—CH(CH₃)—C(=O)O—R³ (R³ is the same as described above):

[Chem. 23]

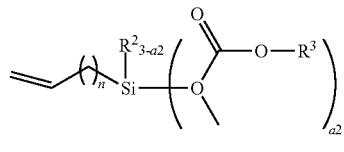

(7)

wherein R², R³, n, and a2 are the same as described above.

In the formula (7), R² and R³ are the same as those of the general formulas (1) and (3), and examples of which are the same as those exemplified for R² and R³ in the formula (1). Among them, R² is preferably a monovalent hydrocarbon group excluding an aliphatic unsaturated hydrocarbon group such as an alkenyl group (an alkyl group, an aryl group, etc.), and more preferably a methyl group or an ethyl group (that is, in the formula (7), the number of alkenyl groups bonded to the silicon atom in the molecule is preferably one). R³ is preferably a methyl group or an ethyl group. R² and R³ may be the same or different, and $R^a$s may be the same or different from each other.

n is 0, 1, or 2 and preferably 0 or 1. a2 is 2 or 3 and particularly preferably 3.

In addition, a methine carbon to which a methyl group of the formula (7) is bonded can be an asymmetric center, but may be any of (R) form, (S) form, and racemate.

Specific examples of the component (E) include vinyltris (ethyl lactate)silane, allyltris(ethyl lactate)silane, methylvinylbis(ethyl lactate)silane, ethylvinylbis(ethyl lactate)silane, vinyltris(methyl lactate)silane, allyltris(methyl lactate)silane, methylvinylbis(methyl lactate)silane, ethylvinylbis(methyl lactate)silane, and the like.

Among them, vinyltris(ethyl lactate)silane and vinyltris (methyl lactate)silane are particularly preferable.

The component (E) may be used singly or in combination of two or more kinds thereof.

With respect to the amount of the component (E) to be used, it is desirable to perform the reaction at a ratio such that the molar ratio of the SiH groups in the component (D) and the alkenyl groups bonded to silicon atoms in the component (E) (SiH groups in the component (D):silicon atom-bonded alkenyl groups in the component (E)) is 1:1 to 1:50, preferably 1:1.8 to 1:30, and more preferably 1:2 to 1:10. If the molar ratio of the silicon atom-bonded alkenyl groups in the component (E) to the SiH group in the component (D) is too small, unreacted component (D) may remain, and if the molar ratio is too large, a large amount of unreacted component (E) may remain after completion of the reaction, so that a large load may be applied to the next step.

[Component (F)]

The platinum group metal catalyst as component (F) is not particularly limited as long as it has an action of promoting an addition reaction (hydrosilylation reaction) between the SiH group-containing organopolysiloxane as the component (D) and the alkenyl group-containing organosilane compound as the component (E).

As the component (F), for example, a conventionally known hydrosilylation reaction catalyst can be used. Specific examples thereof include platinum group metal catalysts such as chloroplatinic acid, alcohol-modified chloroplatinic acid, coordination compounds of chloroplatinic acid with olefins, vinylsiloxane or an acetylene compound, tetrakis(triphenylphosphine)palladium, and chlorotris(triphenylphosphine)rhodium, and the like, and platinum compounds are particularly preferable.

Compounding amount of the component (F) may be an effective amount, and is preferably 0.1 to 1,000 ppm and more preferably 10 to 100 ppm in terms of weight of platinum group metal atoms per the SiH group-containing organopolysiloxane as the component (D). If the amount of the component (F) is too small, the reaction may not proceed efficiently, and if the amount is too large, it is not economically preferable.

[Addition Reaction]

In the organopolysiloxane modified with lactate silyl at both ends represented by the formula (3), the components (D), (E), and (F) are mixed at the above-described compounding ratio to carry out an addition reaction. Reaction conditions can be usually set to a temperature range of 60 to 180° C. and preferably 90 to 150° C. for 5 to 600 minutes and preferably 180 to 360 minutes under atmospheric pressure.

The organopolysiloxane modified with lactate silyl at both ends of the present invention is useful mainly as a main agent (base polymer) such as a surface treatment agent for inorganic materials and a coating agent for water repellent treatment. In particular, it is useful as a raw material siloxane of a delactic acid ester type room-temperature-vulcanizing (RTV) silicone rubber composition used for these applications.

EXAMPLES

Hereinafter, the present invention is described specifically with reference to Examples, but the present invention is not limited to the following Examples. In the following Examples, room temperature is 25° C., Me represents a methyl group, and Et represents an ethyl group. In addition, the degree of polymerization indicates a number average degree of polymerization in GPC analysis using toluene as a developing solvent.

Example 1

A 1-liter three-necked flask equipped with a stirrer, a thermometer, and a Dimroth condenser was charged with 100.0 g of dimethylpolysiloxane having silanol groups at both molecular chain ends represented by the following formula:

[Chem. 24]

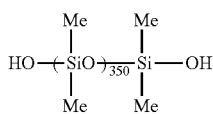

6.7 g of vinyltris(ethyl lactate)silane, and 0.080 g of isopropylamine, and the mixture was mixed and stirred at a rotation speed of 200 rpm at 100° C. for 6 hours. Thereafter, heating was performed at 140° C. for 5 hours under a reduced pressure of 1.3 kPa to remove volatile components. Finally, the inside of the system was cooled to room temperature, and the pressure was returned to atmospheric pressure to obtain a target compound (organopolysiloxane modified with lactate silyl at both molecular chain ends) represented by the following formula (8).

[Chem. 25]

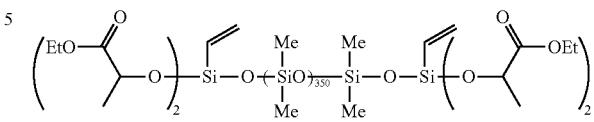

$^{29}$Si-NMR measurement was performed on the target compound represented by the formula (8) to perform structural analysis.

FIG. 1 shows results of $^{29}$Si-NMR measurement. A peak (around −10 ppm) derived from a silanol group at a dimethylpolysiloxane end which had been present before the reaction disappeared, and instead of this, a peak (around −67 ppm) suggesting generation of a hydrolyzable group-containing silyl group (ethyl lactate silyl group) capable of desorbing a lactic acid ester was observed. It could be confirmed that the end silanol group of the dimethylpolysiloxane reacted with vinyltris(ethyl lactate)silane and was almost completely capped with a hydrolyzable group-containing silyl group capable of desorbing the lactic acid ester.

Example 2

The same operation was carried out as in Example 1, except that the amount of silane component to be added was changed to 6.6 g of methyltris(ethyl lactate)silane to obtain a target compound (organopolysiloxane modified with lactate silyl at both molecular chain ends) represented by the following formula (9).

[Chem. 26]

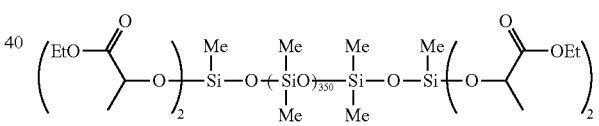

The target compound represented by the formula (9) was subjected to $^{29}$Si-NMR measurement to perform structural analysis.

Figure 2:
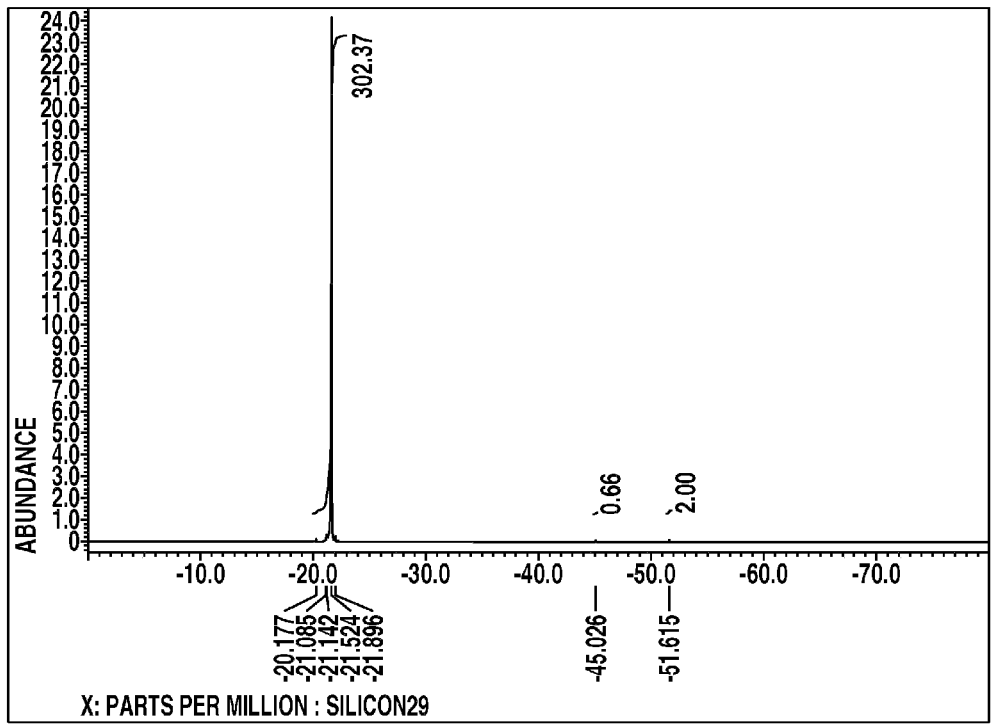
FIG. 2 is a $^{29}$Si-NMR spectrum diagram of an organopolysiloxane modified with lactate silyl at both ends obtained in Example 2 of the present invention.

FIG. 2 shows results of $^{29}$Si-NMR measurement. A peak (around −10 ppm) derived from a silanol group at a dimethylpolysiloxane end which had been present before the reaction disappeared, and instead of this, a peak (around −52 ppm) suggesting generation of a hydrolyzable group-containing silyl group capable of desorbing a lactic acid ester was observed. As in Example 1, it could be confirmed that the end silanol group of the dimethylpolysiloxane reacted with methyltris(ethyl lactate)silane and was almost completely capped with a hydrolyzable group-containing silyl group capable of desorbing the lactic acid ester.

Example 3

A 1-liter three-necked flask equipped with a stirrer, a thermometer, and a Dimroth condenser was charged with 100.0 g of dimethylpolysiloxane having SiH groups at both molecular chain ends (dimethylpolysiloxane capped at both molecular chain ends with dimethylhydrogensiloxy groups) represented by the following formula:

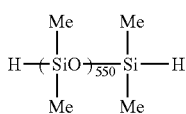

and a platinum catalyst (chloroplatinic acid-vinylsiloxane complex, 10 ppm per the dimethylpolysiloxane as the weight of platinum atoms), and the temperature was raised to 90° C. Next, 5.1 g of vinyltris(ethyl lactate)silane was added to a dropping funnel, and dropping was performed. After completion of the dropwise addition, the resulting mixture was mixed and stirred at 90° C. for 5 hours at a rotation speed of 200 rpm. Thereafter, the catalyst was removed with activated carbon, filtered, and then heated at 140° C. for 5 hours under a reduced pressure of 1.3 kPa to remove volatile components. A target compound (organopolysiloxane modified with lactate silyl at both molecular chain ends) represented by the following formula (10) was obtained.

[Chem. 28]

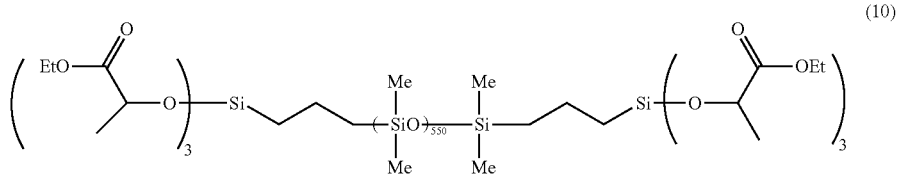

$^{29}$Si-NMR measurement was performed on the target compound represented by the formula (10) to perform structural analysis.

Figure 3:
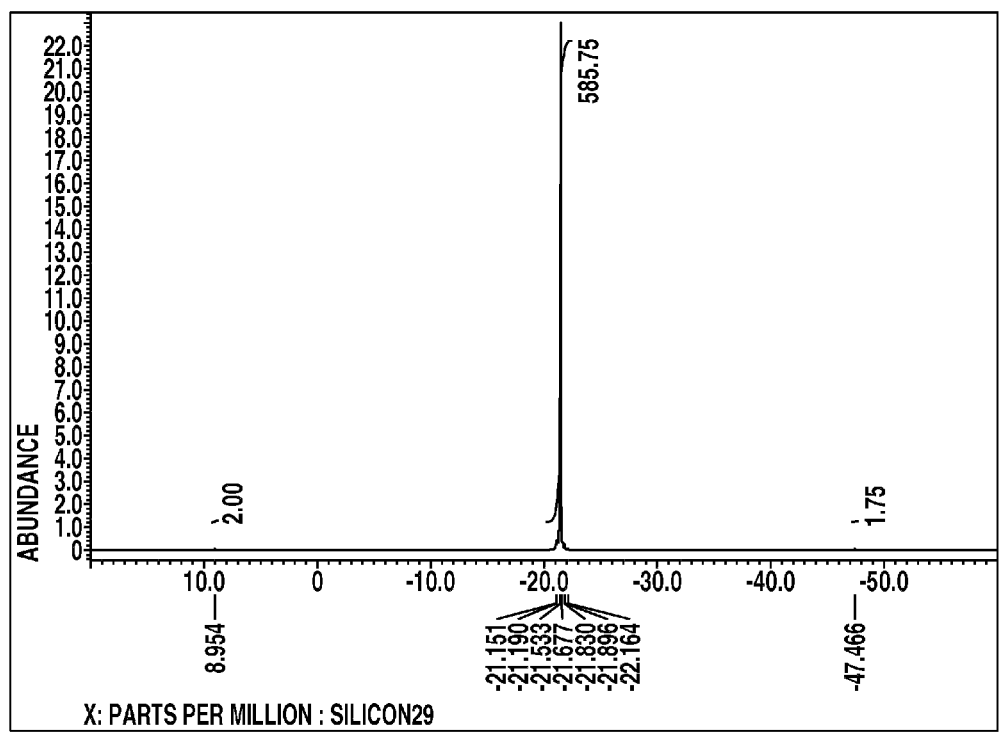
FIG. 3 is a $^{29}$Si-NMR spectrum diagram of an organopolysiloxane modified with lactate silyl at both ends obtained in Example 3 of the present invention.

FIG. 3 shows results of $^{29}$Si-NMR measurement. A peak (around −6 ppm) derived from a SiH group at a dimethylpolysiloxane end which had been present before the reaction disappeared, and instead of this, a peak (around 9.0 ppm) suggesting generation of a hydrolyzable group-containing silyl group (ethyl lactate silyl group) capable of desorbing a lactic acid ester was observed. It could be confirmed that the end SiH group of the dimethylpolysiloxane reacted with vinyltris(ethyl lactate)silane and was almost completely capped with a hydrolyzable group-containing silyl group capable of desorbing the lactic acid ester.

The invention claimed is:

1. An organopolysiloxane modified with lactate silyl at both ends having the following general formula (3):

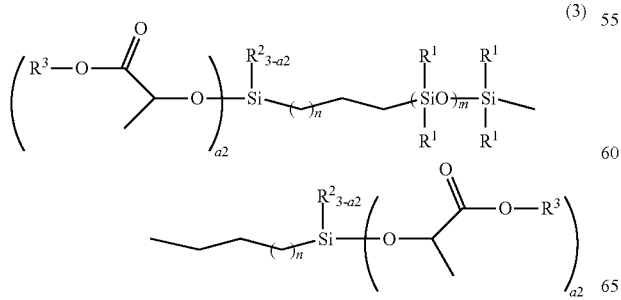

wherein $R^1$, $R^2$, and $R^3$ are each independently an unsubstituted or substituted monovalent hydrocarbon group having 1 to 10 carbon atoms, m is an integer of 10 or more, n is independently 0, 1, or 2, and a2 is independently 2 or 3.

2. A method for producing an organopolysiloxane modified with lactate silyl at both ends having the following general formula (3) according to claim 1,

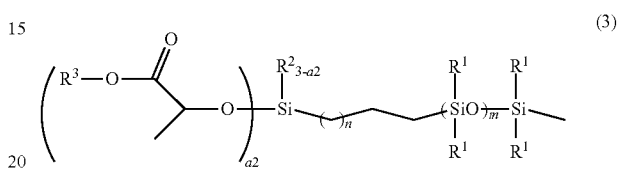

-continued

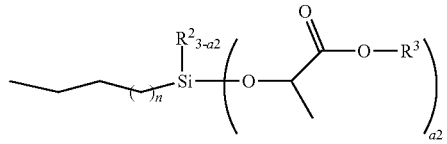

wherein $R^1$ is independently an unsubstituted or substituted monovalent hydrocarbon group having 1 to 10 carbon atoms, $R^2$ and $R^3$ are each independently an unsubstituted or substituted monovalent hydrocarbon group having 1 to 10 carbon atoms, m is an integer of 10 or more, n is 0, 1, or 2, and a2 is 2 or 3, comprising carrying out an addition reaction of:

(D) an organopolysiloxane having SiH groups at both ends having the following general formula (6):

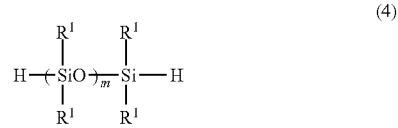

wherein $R^1$ and m are the same as described above, and
(E) an organosilane compound having the following general formula (7):

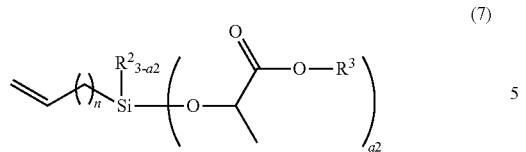
(7)
wherein $R^2$, $R^3$, n, and a2 are the same as described above, in the presence of:
(F) a platinum group metal catalyst.
* * * * *